Aug. 6, 1968          D. A. CHILDS          3,395,933
PORTABLE HITCH
Filed Oct. 10, 1966
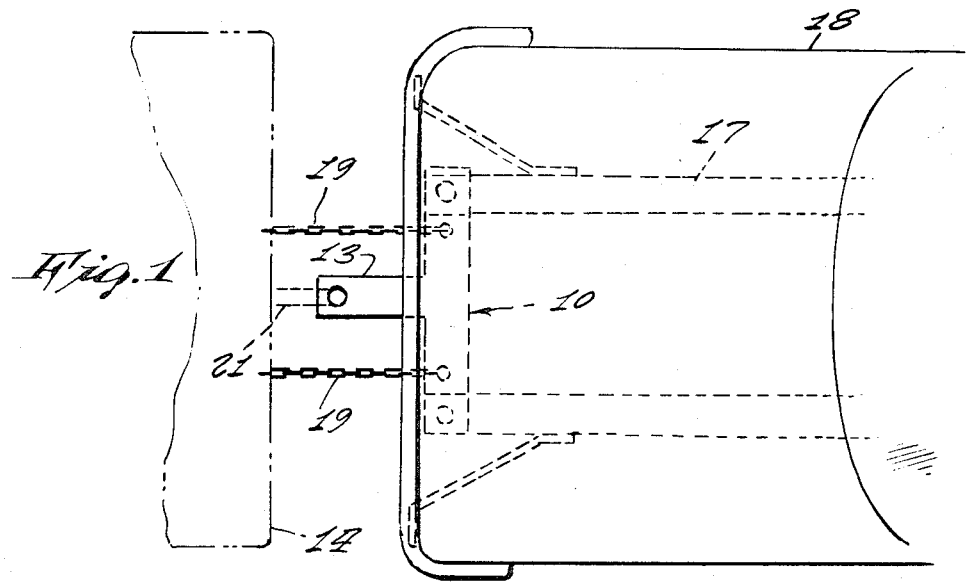
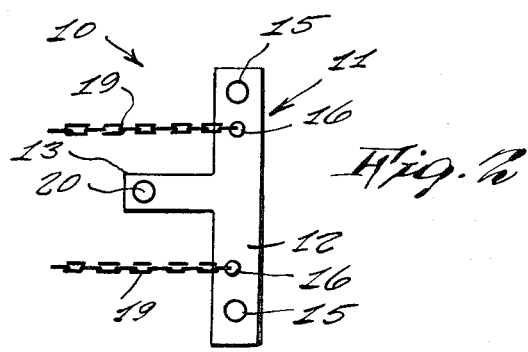
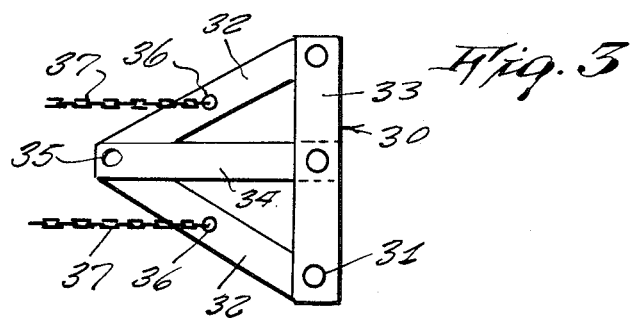
INVENTOR.
DONALD A. CHILDS United States Patent Office 3,395,933
Patented Aug. 6, 1968

3,395,933
PORTABLE HITCH
Donald A. Childs, R.D. 1, Painted Post, N.Y. 14870
Filed Oct. 10, 1966, Ser. No. 585,480
1 Claim. (Cl. 280—457)

ABSTRACT OF THE DISCLOSURE

A portable hitch for use between an automobile and trailer, the hitch including a T-shaped frame having diagonal arms connected between the terminal ends of the T-shaped frame, and each of the arms having a central opening which one end of a chain may be connected for providing additional securement to the trailer.

---

This invention relates generally to hitches. More specifically it relates to hitches of the type that are used for towing a trailer behind an automobile.

A principal object of the present invention is to provide a novel hitch means. It is well known that a greater number of automobiles are today pulling trailers such as house trailers and boat trailers, and that it is necessary for the motorist to install his own hitch to his automobile in order that he may tow the trailer. This, of course, is an extra chore for the motorist which if eliminated would be more preferable.

Accordingly it is another object of the present invention to provide a novel hitch which comprises a standard equipment or optional equipment upon an automobile. The automobile manufacturer would already have the fastening holes made upon the automobile frame, so that if the hitch is an optional equipment, the same may be readily attached by the automotive dealer at the time that the car is sold.

Yet another object of the present invention is to provide a novel hitch which will comprise an additional selling feature for a particular automobile over another.

Other objects of the present invention are to provide a portable hitch which is simple in design, inexpensive to manufacture, rugged in construction, easy to use and efficient in operation.

These and other objects will be readily evident upon a study of the following specification and the accompanying drawing, wherein:

FIGURE 1 is a top plan view of an automobile incorporating the present hitch therewith;

FIGURE 2 is a top plan view of the portable hitch shown per se, and

FIGURE 3 is a top plan view of a modified form of the present invention.

Referring now to the drawing in detail, the numeral 10 represents a portable hitch according to the present invention wherein there is a main body 11 of generally T-shaped configuration and which is made of steel plate or steel bar. The main body includes a longitudinal transverse arm 12 and a relatively short spur 13 which extends toward one side at a longitudinal midportion of the arm. The spur is integral with the arm and forms a means for securing a trailer 14 thereto.

A plurality of openings 15 and 16 are made through the arm, the openings 15 being for the purpose of receiving bolts therethrough in order to secure the portable hitch to the chassis or frame 17 of an automobile 18. A plurality of possibly five openings could already be provided within the frame of the automobile so as to be ready to receive the portable hitch should the automobile purchaser desire the same to be installed.

The openings 16 are for the purpose of receiving one end of chains 19 which extend rearwardly toward the trailer 14, and serve as an additional securement thereof. The opening 20 in the end of the spur 13 is for the purpose of receiving a connecting member 21 from the trailer which may be bolted thereto.

In a modified construction shown in FIGURE 3 of the drawing, there is a T-shaped member 30 which has like openings 31 for securement of the portable hitch to an automotive vehicle and which further includes diagonal arms 32, each of which extends from an end of transverse arm 33 to the tip of the spur 34 thereby providing greater rigidity to the hitch. An opening 35 is provided in the end of the spur to provide means for securement for a trailer, and each diagonal arm 32 is provided with an opening 36 for receiving therein one end of a chain 37 that provides additional securement between the portable hitch and the trailer being towed.

In operative use portable hitch is secured to a frame of an automobile so that the spur extends rearwardly to which a trailer may be attached. The loose ends of the chains secured to the portable hitch are then also attached to the trailer being towed.

While various changes may be made in the detailed construction it is understood that such changes will be within the spirit and scope of the present invention as is defined by the appended claim.

I claim:

1. In a portable hitch, the combination of a T-shaped member, said member being made of steel plate, said T-shaped member comprising a transverse arm, said transverse arm having a spur integral with a mid portion thereof, said spur extending at 90 degrees sideward to said arm, said arm having means for securement to a frame of an automobile, and said spur having means for securement to a trailer being towed by said automobile, said means for securing a trailer to said spur comprising an opening near the end of said spur for receiving a connecting member of said trailer, said portable hitch including a pair of chains, said means for securing to an automobile frame comprising an opening near the ends of said arm for receiving bolts therethrough to secure said portable hitch to an automobile frame, said portable hitch including a pair of diagonal arms secured at their one ends to the ends of said transverse arm, the opposite ends of said diagonal arms being secured to the end of said spur to provide rigidity means to said portable hitch, each of said diagonal arms having an opening centrally located therein for receiving one end of each of said chains, and the loose opposite ends of said chains being securable to said trailer so to provide additional securement means thereto.

References Cited

UNITED STATES PATENTS

| 2,097,006 | 10/1937 | Weis | 280—501 |
| 2,549,941 | 4/1951 | Smith | 280—501 |
| 2,576,383 | 11/1951 | Avery | 280—501 X |
| 2,646,289 | 7/1953 | Smith | 280—501 |
| 2,712,945 | 7/1955 | Peterson | 280—457 |
| 2,760,789 | 8/1956 | Wampler | 280—491 X |

FOREIGN PATENTS 697,825   11/1930   France.

LEO FRIAGLIA, Primary Examiner.